United States Patent
Mills et al.

(10) Patent No.: US 6,850,662 B1
(45) Date of Patent: *Feb. 1, 2005

(54) OPTICAL SWITCH FOR RECIPROCAL TRAFFIC

(75) Inventors: James D. Mills, Wilmington, MA (US); Philip J. Lin, Newton, MA (US); Roger P. Holmstrom, St. Charles, IL (US)

(73) Assignee: Tellabs Operations, Inc., Naperville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/680,443

(22) Filed: Oct. 7, 2003

Related U.S. Application Data

(63) Continuation of application No. 10/037,054, filed on Jan. 3, 2002, now Pat. No. 6,650,804, which is a continuation of application No. 09/799,954, filed on Mar. 6, 2001, now Pat. No. 6,363,182.
(60) Provisional application No. 60/221,796, filed on Jul. 31, 2000.

(51) Int. Cl.$^7$ ................................................. G02B 6/42
(52) U.S. Cl. ............................. 385/18; 385/16; 385/17
(58) Field of Search .................... 385/16–18, 20–21, 385/24; 398/108, 110, 119, 130

(56) References Cited

U.S. PATENT DOCUMENTS

| | | | |
|---|---|---|---|
| 3,823,401 A | 7/1974 | Berg et al. ................... 343/204 |
| 4,038,497 A | 7/1977 | Collins et al. ................. 179/15 |
| 4,239,329 A | 12/1980 | Matsumoto .............. 350/96.15 |
| 4,289,373 A | 9/1981 | Sugimoto et al. ........ 350/96.16 |
| 4,493,113 A | 1/1985 | Forrest et al. ............... 455/606 |
| 4,684,796 A | 8/1987 | Johnson ....................... 250/201 |
| 4,787,692 A | 11/1988 | Spanke .................... 350/96.16 |
| 4,846,542 A | 7/1989 | Okayama et al. ......... 350/96.15 |
| 4,889,404 A | 12/1989 | Bhagavatula et al. ..... 350/96.16 |
| 4,904,042 A | 2/1990 | Dragone ................... 350/96.16 |
| 5,009,477 A | 4/1991 | Alferness et al. ......... 350/96.15 |
| 5,048,910 A | 9/1991 | Caron .......................... 385/17 |
| 5,077,483 A | 12/1991 | Cloonan et al. ............. 359/135 |
| 5,146,358 A | 9/1992 | Brooks ........................ 359/181 |
| 5,208,880 A | 5/1993 | Riza et al. ..................... 385/18 |
| 5,255,332 A | 10/1993 | Welch et al. .................. 385/17 |
| 5,272,555 A | 12/1993 | Suzuki ......................... 359/113 |
| 5,274,487 A | 12/1993 | Fujimoto et al. ............ 359/117 |
| 5,301,008 A | 4/1994 | Huang et al. ................ 356/345 |
| 5,343,314 A | 8/1994 | Nakamura et al. ........... 359/123 |
| 5,359,683 A | 10/1994 | Pan .............................. 385/22 |
| 5,408,350 A | 4/1995 | Perrier et al. ................ 359/168 |
| 5,416,662 A | 5/1995 | Kurasawa et al. ........... 361/118 |
| 5,469,277 A | 11/1995 | Kavehrad et al. ............. 359/15 |
| 5,471,340 A | 11/1995 | Cheng et al. ................ 359/281 |
| 5,524,153 A | 6/1996 | Laor ............................ 385/16 |
| 5,552,918 A | 9/1996 | Krug et al. .................. 359/152 |
| 5,588,078 A | 12/1996 | Cheng et al. .................. 385/33 |

(List continued on next page.)

FOREIGN PATENT DOCUMENTS

| | | |
|---|---|---|
| DE | 3335128 | 4/1985 |
| WO | WO 00/73842 | 12/2000 |
| WO | WO 01/65300 | 9/2001 |
| WO | WO 01/73935 | 10/2001 |

*Primary Examiner*—Phan T. H. Palmer
(74) *Attorney, Agent, or Firm*—Welsh & Katz, Ltd.

(57) ABSTRACT

A reduced component optical switch module includes a plurality of ports wherein each port includes an optical input and an optical output. A plurality of switchable deflectors in combination with a plurality of non-switchable deflectors can be used to establish transmission paths between pairs of ports to support traffic reciprocity. In one embodiment, the ports and switchable elements are configured so as to provide substantially constantly transmission paths within the respective module. In another embodiment, additional deflector elements can be provided to implement loop-back functionality at one or more of the ports.

28 Claims, 3 Drawing Sheets

U.S. PATENT DOCUMENTS

| | | | |
|---|---|---|---|
| 5,608,565 A | 3/1997 | Suzuki et al. | 359/237 |
| 5,623,562 A | 4/1997 | Anderson et al. | 385/16 |
| 5,642,446 A | 6/1997 | Tsai | 385/16 |
| 5,648,963 A | 7/1997 | Miyake et al. | 370/218 |
| 5,652,813 A | 7/1997 | Wilson | 385/24 |
| 5,663,818 A | 9/1997 | Yamamoto et al. | 359/118 |
| 5,680,234 A | 10/1997 | Darcie et al. | 359/110 |
| 5,712,932 A | 1/1998 | Alexander et al. | 385/24 |
| 5,729,642 A | 3/1998 | Thaniyavarn | 385/17 |
| 5,734,763 A | 3/1998 | Chang | 385/11 |
| 5,739,933 A | 4/1998 | Dembeck et al. | 359/117 |
| 5,742,717 A | 4/1998 | Saitoh | 385/46 |
| 5,841,917 A | 11/1998 | Jungerman et al. | 385/17 |
| 5,943,454 A | 8/1999 | Aksyuk et al. | 385/22 |
| 5,960,132 A | 9/1999 | Lin | 385/18 |
| 5,994,159 A | 11/1999 | Aksyuk et al. | 438/52 |
| 6,002,818 A | 12/1999 | Fatehi et al. | 385/17 |
| 6,005,998 A | 12/1999 | Lee | 385/33 |
| 6,044,705 A | 4/2000 | Neukermans et al. | 73/504.02 |
| 6,212,309 B1 | 4/2001 | Nguyen et al. | 385/17 |
| 6,215,921 B1 | 4/2001 | Lin | 385/18 |
| 6,259,833 B1 | 7/2001 | Doerr et al. | 385/17 |
| 6,278,812 B1 | 8/2001 | Lin et al. | 385/18 |
| 6,282,336 B1 | 8/2001 | Riza | 385/21 |
| 6,292,281 B1 | 9/2001 | Bala et al. | 359/110 |
| 6,292,600 B1 | 9/2001 | Goldstein et al. | 385/19 |
| 6,317,532 B1 | 11/2001 | Lin et al. | 385/18 |
| 6,366,713 B1 | 4/2002 | Lin et al. | 385/16 |
| 6,650,804 B2 * | 11/2003 | Mills et al. | 385/17 |

* cited by examiner

OPTICAL SWITCH FOR RECIPROCAL TRAFFIC

This application is a continuation of utility application Ser. No. 10/037,054 filed Jan. 3, 2002 now U.S. Pat. No. 6,650,804, which is a continuation of utility application Ser. No. 09/799,954 filed Mar. 6, 2001 now U.S. Pat. No. 6,363,182, which claimed the benefit of a Jul. 31, 2000 filing date of Provisional application No. 60/221,796.

FIELD OF THE INVENTION

The invention pertains to optical switches. More particularly, the invention pertains to such switches having reduced numbers of switchable transmission path defining elements.

BACKGROUND OF THE INVENTION

Known forms of switched optical communication systems incorporate fiberoptics as a medium for communicating messages carried by modulated beams of radiant energy. Such messages at times need to be switched between optical fibers. One known form of optical switch is a crossbar switch.

Known optomechanical crossbar switches use moving mirrors to create connections between inputs and outputs. Various mechanisms can be used to switch or move the mirrors or otherwise to cause them to be actuated and to be in a state to create a connection.

FIG. 1 illustrates a known optical crossbar switch module 10 having four inputs and four outputs. Such switch modules receive a plurality of modulated light beams to be switched at input ports such as ports 12-1, 12-2, 12-3, 12-4 ... 12-N. Switched light beams exit module 10 at output ports 14-1, 14-2, ... 14-N.

The rectangles inside module 10 represent mirrors. The gray rectangle 16 is a fixed mirror. The dashed rectangles 20a–20k are non-actuated mirrors. Nonactuated mirrors permit beams to pass without substantial deflection. The black rectangles 22a–22d are actuated mirrors. Actuated mirrors substantially deflect incident beams.

In the example of FIG. 1, input ports 12-1, 12-2, 12-3, and 12-4 are coupled to output ports 14-2, 14-3, 14-4, and 14-1, respectively. Actuating the appropriate correct set of mirrors enables the switch to make all connection permutations.

Lenses, such as lens 18a, at the inputs and outputs of switch module 10 keep the light beams collimated while traversing the free space inside the optical switch. Fibers provide inputs to and transmit outputs from the switch 10 and they are precisely aligned to the collimating lenses. The number of switchable mirrors required in this architecture is $N^2-1$.

SUMMARY OF THE INVENTION

A reduced component non-blocking optical switch, or switch module, which supports all traffic that qualifies as reciprocal traffic, includes a plurality of optical ports. Each port has an optical input and optical output associated therewith. The ports couple incident communication beams, such as incident light beams, into a switching region within the switch. Transmission paths established within the switch support reciprocal traffic. Transmission paths can include free space, optical fibers or waveguides.

In one embodiment, a plurality of fixed mirrors or deflectors is positioned substantially diagonally within the switch at optical cross points. The fixed deflectors are located at cross points in the switch where the transmission paths exhibit 90° angles and are oriented at 45° relative to the transmission paths. Other cross points within the switch are occupied by switchable deflectors or mirrors which can be switched to complete respective paths. By combining both fixed and switchable deflector elements, transmission paths can be established between selected pairs of ports thereby supporting the reciprocal traffic.

In another aspect, the ports can be staggered relative to the deflectors so that the path lengths between pairs of ports are substantially constant. In yet another embodiment, some or all of the fixed deflectors can be replaced with combinations of a switchable deflector and a fixed path reversing deflector, such as a V-shaped mirror, to provide loop-back functionality for selected of the ports.

In yet another aspect, deflectors can be implemented as fixed or movable mirrors, or alternately instead of movable mirrors, fixed mirrors with movable mechanical optical deflectors. Solid state deflectors can be used as an alternate.

In one aspect, deflectors can be implemented as optical bubbles using internal reflections or holographic gratings.

Switch modules in accordance herewith can be combined in various configurations to implement multi-stage switches. In one embodiment, non-blocking multi-stage switches can be implemented using, in part, multiple switch modules in accordance herewith to facilitate reciprocal traffic.

Numerous other advantages and features of the present invention will become readily apparent from the following detailed description of the invention and the embodiments thereof, from the claims and from the accompanying drawings.

DETAILED DESCRIPTION OF THE PREFERRED EMBODIMENTS

Figure 1:
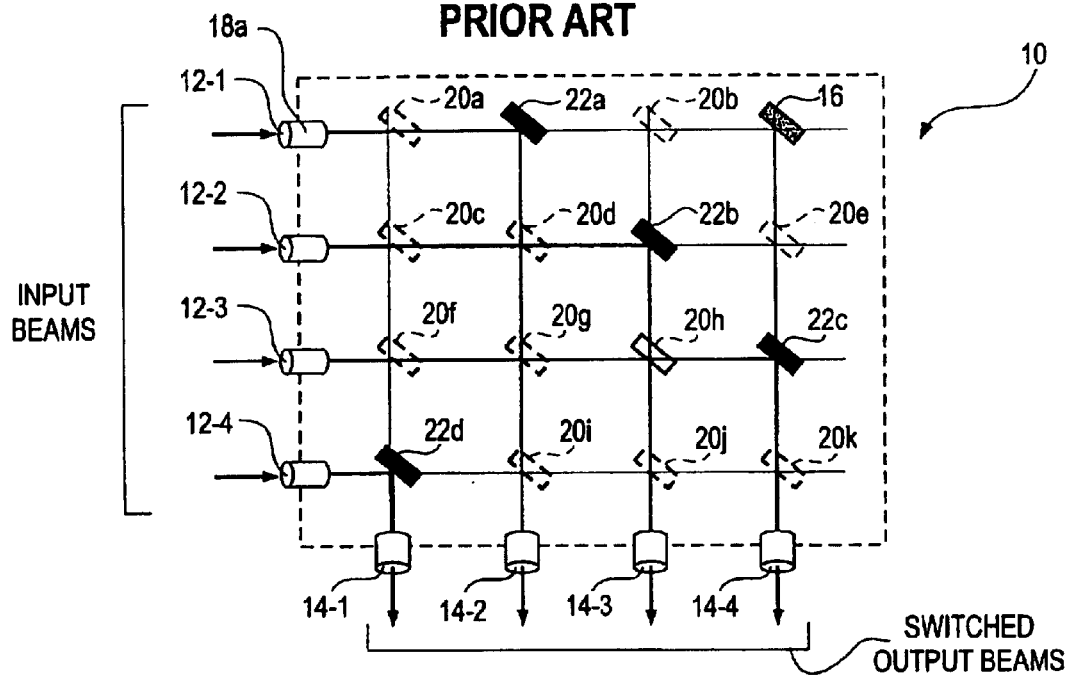
FIG. 1 is a diagram illustrating a prior art crossbar switch.

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

In telecommunication applications, a condition called traffic reciprocity often exists. Traffic reciprocity is defined as the condition where input B is connected to output A whenever input A is connected to output B.

The exemplary connections illustrated in FIG. 1 do not correspond to reciprocal traffic. Specifically, input 1 is connected to output 2 whereas input 2 is not connected to output 1 as required by the definition of reciprocal traffic.

Because the module 10 supports all traffic connections (both reciprocal and non-reciprocal), it provides greater flexibility than is required in applications where traffic reciprocity exists. The price of this flexibility is the requirement to have $N^2-1$ switchable deflectors or mirrors for an N×N switch.

By exploiting the presence of traffic reciprocity, an exemplary 4×4 (N=4) switch module 10a as in FIG. 2, described below exhibits reduced switch complexity as compared to the crossbar switch of FIG. 1. Switch module 10a includes input/output ports 28-1, -2, -3 . . . -N. Each port is coupled to at least one source medium, such as an input optical fiber and at least one destination medium, an output fiber.

It will be understood that module 10a could be operated under the control of control circuits 10a-1. These control circuits could be part of a larger communications system without departing from the spirit and scope of the present invention. It will also be understood that multiple reciprocal-traffic switches, such as module 10a, can be included in larger single or multiple stage switches.

Figure 2:
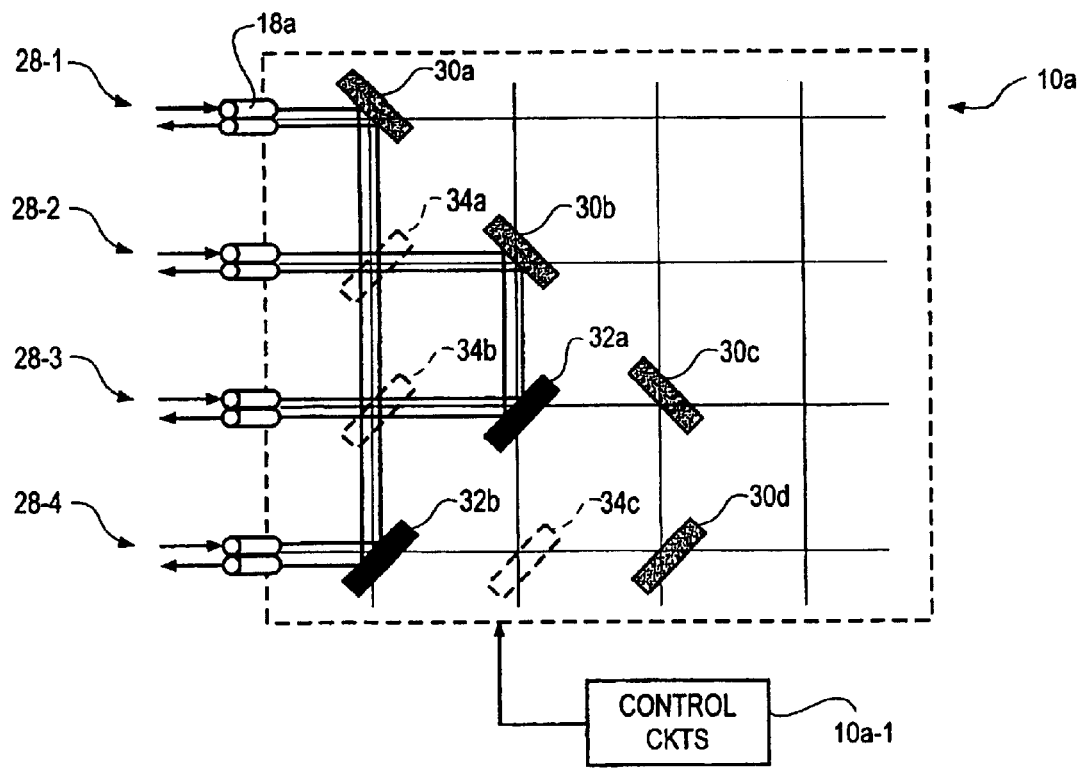
FIG. 2 is a diagram illustrating a reduced component switch in accordance with the present invention.

When reciprocity exists, the inputs and outputs can be co-located and paired as illustrated in FIG. 2. It will also be understood that each input/output port, such as 28-i, can be coupled to an input optical fiber and an output optical fibre. Alternately, a single coupled fiber could be used to carry bidirectional traffic.

For an N×N switch, the gray rectangles 30a, b, c . . . N denote fixed deflectors or mirrors. They always deflect an incident beam. Black rectangles 32a, b denote actuated deflectors or mirrors and dashed rectangles 34a, b, c denote non-actuated deflectors or mirrors. Deflectors 32a, b and 34a, b, c are all switchable between states.

FIG. 2 illustrates an example where port 28-1 is coupled optically to port 28-4 and port 28-2 is coupled optically to port 28-3. The forward path and the reverse path of the reciprocal traffic are deflected off the same deflectors or mirrors.

Assume a pair of reciprocal connections is to be made between input number A and number B where A<B. Then the two deflectors used for this pair of paths are the fixed deflector or mirror in row A and the actuated deflector or mirror in row B in column A.

Although FIG. 2 illustrates a 4×4 switch 10a, this architecture can be extended to an N×N switch module. The required number of switchable deflectors or mirrors is [N*(N−1)/2]−1. This is about half as many as those used by the crossbar module 10.

Figure 3:
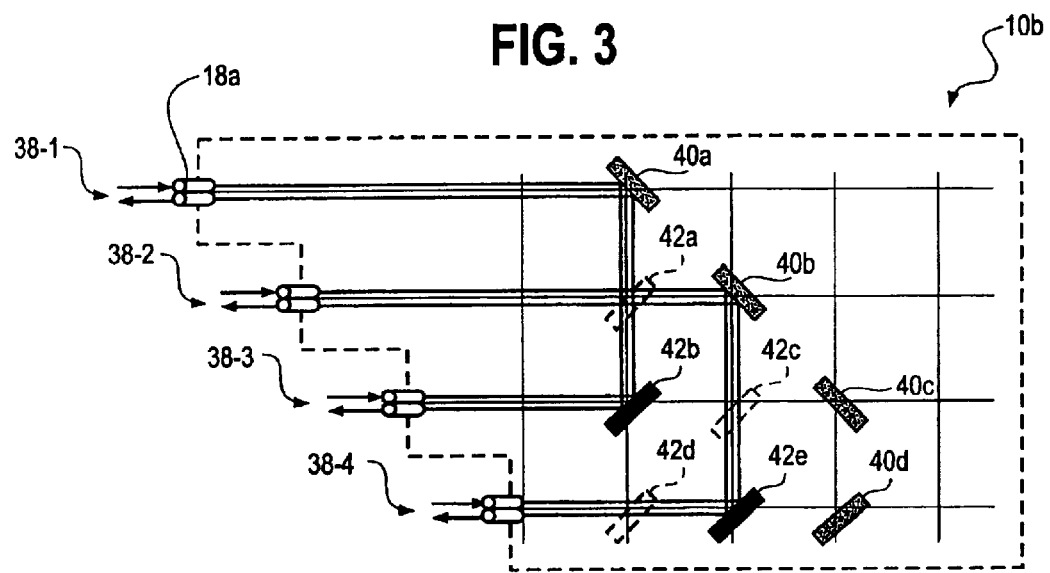
FIG. 3 is a diagram illustrating an alternate configuration of the switch of FIG. 2.

An improvement can be made to the switch 10a using staggered input and output ports 38-1, -2, -3 . . . -N as illustrated by switch 10b, FIG. 3. In FIG. 2, the path lengths of the paths are of unequal length. Path lengths are directly related to the amount of loss an optical signal incurs. The loss is due to the divergence of the light. The light diverges even in the presence of good collimating lenses. Therefore, it is desirable to make all path lengths equal, regardless of connection, in order to reduce the variability in insertion loss.

Switch 10b, FIG. 3 provides equal path lengths. In FIG. 3, fixed and switchable deflectors are represented using the same conventions as used in FIG. 2. Deflectors 40a, b, c, d are fixed. Remaining deflectors 42a, b, c, d, e are switchable.

As illustrated in FIG. 3, ports 38-1 and 38-3 are coupled together, and ports 38-2 and 38-4 are coupled together. These respective path lengths are of substantially the same length. Pairs of staggered input and output ports create equal length light paths, for example the connection between ports A and B where A<B. The deflectors used are the fixed deflectors on row A and the actuated deflector or mirror on row B. The fixed deflector or mirror is N units away from the input to port A. The actuated deflector or mirror is N−B+A units away from an input to port B. The distance between the two deflectors or mirrors is B−A. Therefore, the total length, in free space, of the light path is N+(N−B+A)+(B−A)=2N which, is independent of the particular choice of A and B.

Figure 4:
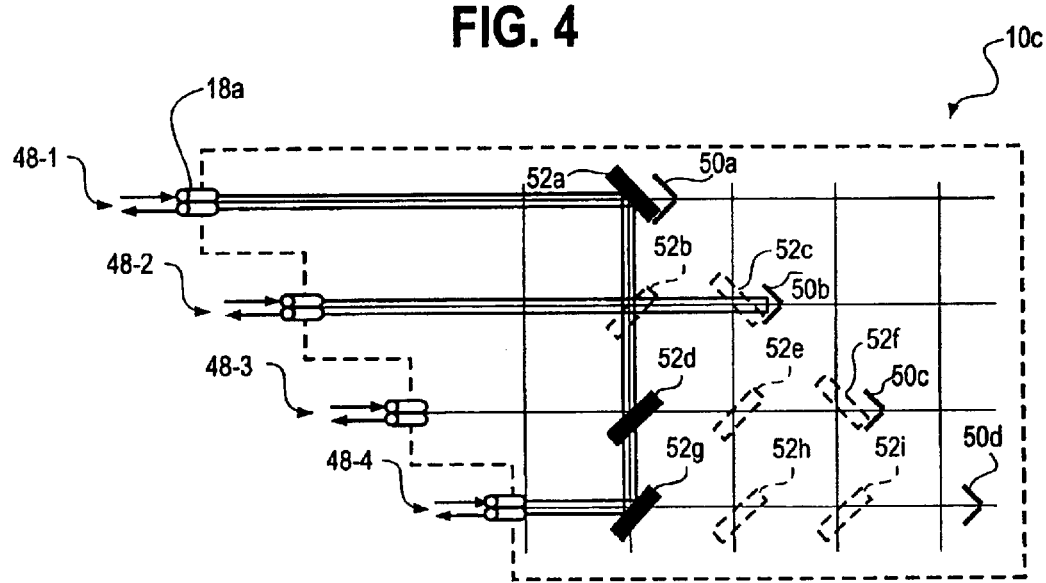
FIG. 4 is a diagram illustrating yet another configuration of the switch of FIG. 2.

In another embodiment, switch 10c, FIG. 4, can be modified to include a loop-back function. Loop-back is present when an input at a port is to be coupled with the corresponding output at the same port.

Adding a fixed deflector, such as a V-shaped mirror at the end of each row, such as deflectors 50a, b, c, d, provides a loop-back function. Deflectors 52a, b, c . . . i are switchable. In this embodiment, the constant path length property of module 10b is almost preserved with the exception that loop-back paths are slightly longer.

As illustrated in FIG. 4, ports 48-1 and 48-4 are coupled together. Port 48-2 is looped-back on itself. Port 48-3 is unused.

The number of switchable deflectors or mirrors for an N×N switch as in FIG. 4 is [N(N+1)/2]−1. This is slightly larger than the number used by the switch 10a of FIG. 2 without loop-back. However, it is still approximately one/half the number required by the switch 10.

There are a variety of possible physical implementations. The deflectors or mirrors can move in and out of position by using either a sliding or tilting mechanism. They could be non-moving multi-state solid state deflectors. The input and output fibers should be rested on V-grooves for better alignment with the collimating lenses. The lenses, deflectors or mirrors, and v-grooves may all be part of a MEMS (micro-electromechanical systems) platform. It will be understood that the details of implementation of the various deflectors or mirrors are not limitations of the present invention.

Figure 5:
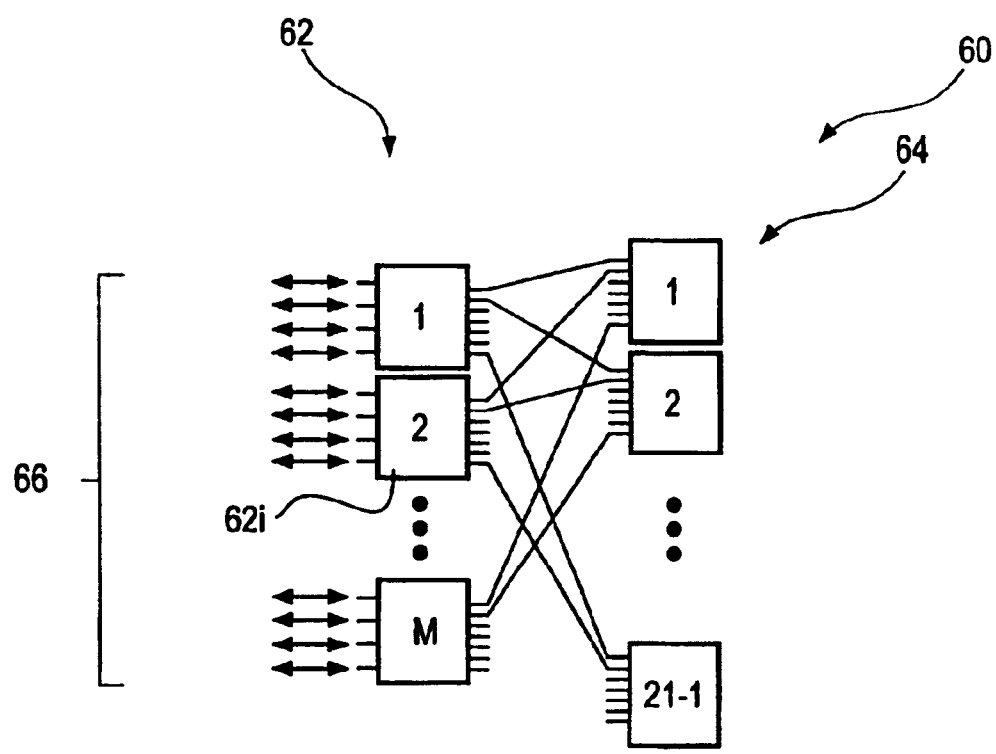
FIG. 5 is a multi-stage switch which incorporates switch modules in accordance herewith.

Switch configurations, such as 10a, 10b and 10c can be used as building blocks to create larger multi-stage switches for reciprocal traffic. FIG. 5 illustrates an exemplary multi-stage switch 60 of a known type as disclosed in published PCT application WO 00/14583, assigned to the assignee hereof.

As illustrated in FIG. 5, the switch 60 employs two groups of switching modules 62 and 64. The first group of modules 62 includes a plurality of (L,2L-1)-way modules 1-M. The (L,2L-1)-way modules 62 can be implemented in a variety of ways, as would be understood by those of skill in the art and are not a limitation of the present invention. The second group of modules 64 includes a plurality of M-way reciprocal switching modules 1-2L-1. The M-way modules 64 can be implemented in accordance with the principles of any of the modules described above in connection with FIGS. 2–4.

The modules 62 are connected to the modules 64 so the externally disposed I/O ports 66 handle reciprocal traffic in a non-blocking fashion. To this end, the modules are interconnected by optical fibers as illustrated in the exemplary switch 60 of FIG. 5. It will be understood that a variety of switch architectures using modules 10a, 10b, 10c, could be implemented in multi-stage switches to support reciprocal switch traffic without departing from the spirit and scope of the present invention.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed:

1. A multi-stage modular optical switch comprising:
 a first group (L, 2L-1) switching modules, the first group having M members and configured to support non-blocking reciprocal traffic at LXM ports;
 a second group of M-way reciprocal switching modules, the second group having 2L-1 members with each configured to support non-blocking reciprocal traffic at M ports with each member of the second group having less than [N*(N−1)/2] switchable deflectors.

2. A switch as in claim 1 which includes M×(2L-1) interconnections between the groups.

3. A switch as in claim 2 where each member of the second group incorporates as switchable deflecting elements one of switchable reflectors, optical bubbles or holographic gratings.

4. A switch as in claim 3 where the deflecting elements are arranged on transmission paths having a substantial common predetermined length.

5. A switch as in claim 2 where each member of the second group incorporates a plurality of transmission paths which have substantially a common length.

6. A switch as in claim 2 where at least some members of the second group include a loop-back element.

7. A switch as in claim 1 which includes signal interconnections between members of the first group and members of the second group.

8. A switch as in claim 7 where each of 2L-1 ports of each member of the first group is coupled to a port of a different one of the 2L-1 members of the second group.

9. A switch as in claim 8 which includes M×(2L-1) interconnections between the groups.

10. A modular switch for non-blocking reciprocal traffic comprising:
    a first plurality of substantially identical bidirectional switching modules, the ports of each member of the plurality support reciprocal traffic;
    a second plurality of substantially identical reciprocal traffic switching modules, each member of the second plurality has M inputs and on the order of [M*(M-1)2] switchable path selecting elements and each member of the second plurality is coupled to the members of the first plurality to support non-blocking reciprocal traffic relative to the ports of the first plurality.

11. A modular switch as in claim 10 where the members of the second plurality exhibit substantially a common path length.

12. A modular switch for non-blocking reciprocal traffic comprising:
    a plurality of substantially identical bi-directional switching modules, each of the modules has a plurality of bi-directional ports;
    a plurality of substantially identical reciprocal traffic switching modules, each member of the plurality of reciprocal traffic modules has a selected number of inputs and has switchable path selecting elements on the order of one half the selected number multiplied by itself;
    each member of the plurality of reciprocal traffic modules is coupled to the members of the plurality of bi-directional switching modules to support non-blocking reciprocal traffic relative to the ports.

13. A method of implementing signal switching comprising:
    coupling any one of L input signals in M groups, to any one of (2L-1) outputs in M groups;
    transferring each of the (2L-1) outputs to one of the M inputs in (2L-1) groups;
    switching each of the M inputs, as an intermediate output, to any one of the other M-1 inputs to implement non-blocking reciprocal traffic among at least M bidirectional paths;
    coupling each of the intermediate outputs to a different group of (2L-1) outputs; and
    providing the coupled intermediate outputs to at least some of the L input signals in M groups.

14. A method as in claim 13 including providing bi-directional coupling of L input signals with (2L-1) outputs for at least some of the M groups.

15. A method as in claim 14 including switching signals among the M groups with substantially a common path length.

16. A method as in claim 13 where at least M bi-directional paths have a substantially common length.

17. A method as in claim 13 including altering at least M bi-directional paths at [M*(M-1)/2]-1 sites.

18. A method of switching communications signals comprising:
    injecting up to N communications signals into a region;
    deflecting selected pairs of injected signals at up to (N*(N-1)/2)-1 locations so that each of the members of each pair of injected signals becomes an output associated with the other injected signal of the respective pair.

19. A method as in claim 18 which includes looping selected of the injected signals back on themselves to form a pair of substantially identical signals, one being the injected signal, the other being an output signal.

20. A method as in claim 18 which includes deflecting first and second pairs of signals so that the signals of each pair traverse a common path length.

21. A method as in claim 18 which includes arranging first and second pairs of signals so that the signals of each pair traverse a common path length.

22. A method of switching communications signals comprising:
    injecting up to a selected number of communications signals into a region;
    deflecting selected pairs of injected signals at up to a selected number of locations so that each of the members of each pair of injected signals becomes an output associated with the other injected signal of the respective pair.

23. A method as in claim 22 which includes looping selected of the injected signals back on themselves to form a pair of substantially identical signals, one being the injected signal, the other being an output signal.

24. A method as in claim 22 which includes deflecting first and second pairs of signals so that the signals of each pair traverse a common path length.

25. A method as in claim 22 which includes arranging first and second pairs of signals so that the signals of each pair traverse a common path length.

26. A method of implementing signal switching comprising:
    selecting a number of inputs;
    dividing the inputs into a first number of groups;
    coupling any one of the inputs in any one of the groups to any one of a selected number of outputs, on the order of twice the number of inputs in any one of the groups;
    selecting a second number of inputs;
    selecting a second number of groups, the second number is on the order of twice the number of inputs in any one of the first groups;
    coupling each of the outputs to one of the second inputs in the second groups to implement non-blocking reciprocal traffic among at least as many paths as the number of inputs.

27. A method as in claim 26 where the paths are bidirectional and have a common length.

28. A method as in claim 26 where the second number of inputs corresponds to the first number of groups.

* * * * *